Sept. 28, 1965  H. SCHATZ  3,208,208
AUTOMATIC REEL AND TABLE COMBINATION FOR HARVESTERS
Filed April 13, 1964  3 Sheets-Sheet 1

INVENTOR
HERMAN SCHATZ
BY
ATTORNEY

Sept. 28, 1965 H. SCHATZ 3,208,208
AUTOMATIC REEL AND TABLE COMBINATION FOR HARVESTERS
Filed April 13, 1964 3 Sheets-Sheet 3

INVENTOR
HERMAN SCHATZ
BY
ATTORNEY

United States Patent Office 3,208,208
Patented Sept. 28, 1965

1

3,208,208
AUTOMATIC REEL AND TABLE COMBINATION FOR HARVESTERS
Herman Schatz, General Delivery, Swift Current, Saskatchewan, Canada
Filed Apr. 13, 1964, Ser. No. 359,352
4 Claims. (Cl. 56—221)

My invention relates to new and useful improvements in automatically compensating reel and table assemblies for harvesters, combines and the like.

Conventional harvesting machines include a table assembly having a cutter assembly spanning the front edge of the base thereof and a collecting assembly therebehind to receive the cut grain and to transport rearwardly through the harvester. The grain is deposited onto the conveying assembly by means of a rotating reel and although the table assembly normally can be raised or lowered within limits, the reel assembly maintains the same relationship with respect to the knife assembly irrespective of the height of the table from the ground.

Some harvesters include means for varying the distance of the reel and knife assembly, either by means of turnbuckles, bolts, or separate hydraulic controls to raise and lower the reel independently of the table assembly.

However, apart from the hydraulic control method, the other methods are awkard inasmuch as the operator has to stop the combine or harvester, reposition the reel with reference to the knife assembly, and then continue harvesting.

This means that it is inconvenient to change the relationship between the reel and the table assembly and results in poor harvesting particularly in fields having uneven growth wherein the height of the grain may vary from several inches to several feet.

While the hydraulic control reel assemblies overcome these disadvantages to a certain extent, nevertheless it is difficult for the operator to ascertain the distance between the reel and the knife and in any event a separate control and hydraulic system has to be incorporated.

It is well known that when cutting relatively short grain, under which circumstances the knife assembly is close to the ground, it is desirable that the reel assembly be relatively close to the knife assembly. Conversely when cutting relatively tall grain, it is desirable that the distance between the reel assembly and the knife assembly be increased.

I have overcome these disadvantages by providing flexible linkage between the harvester and the reel arms which cooperates with pulleys or the like secured to the table assembly to raise the reel assembly automatically a greater distance from the knife assembly when the table assembly is raised and, conversely, to lower the reel assembly in closer proximity to the knife assembly, when the table is lowered, all taking place automatically as the table assembly is operated.

The principal object and essence of my invention is therefore to provide a device of the character herewithin described in which the distance between the reel assembly and the knife assembly is automatically adjusted as the table assembly is raised or lowered.

Another object of the invention is to provide a device of the character herewithin described which is readily adapted to be fitted to existing machines.

A further object of the invention is to provide a device of the character herewithin described in which the adjustment is carried out without the necessity of a separate source of power.

A still further object of the invention is to provide a device of the character herewithin described which is simple in construction, economical in manufacture, and

2 otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
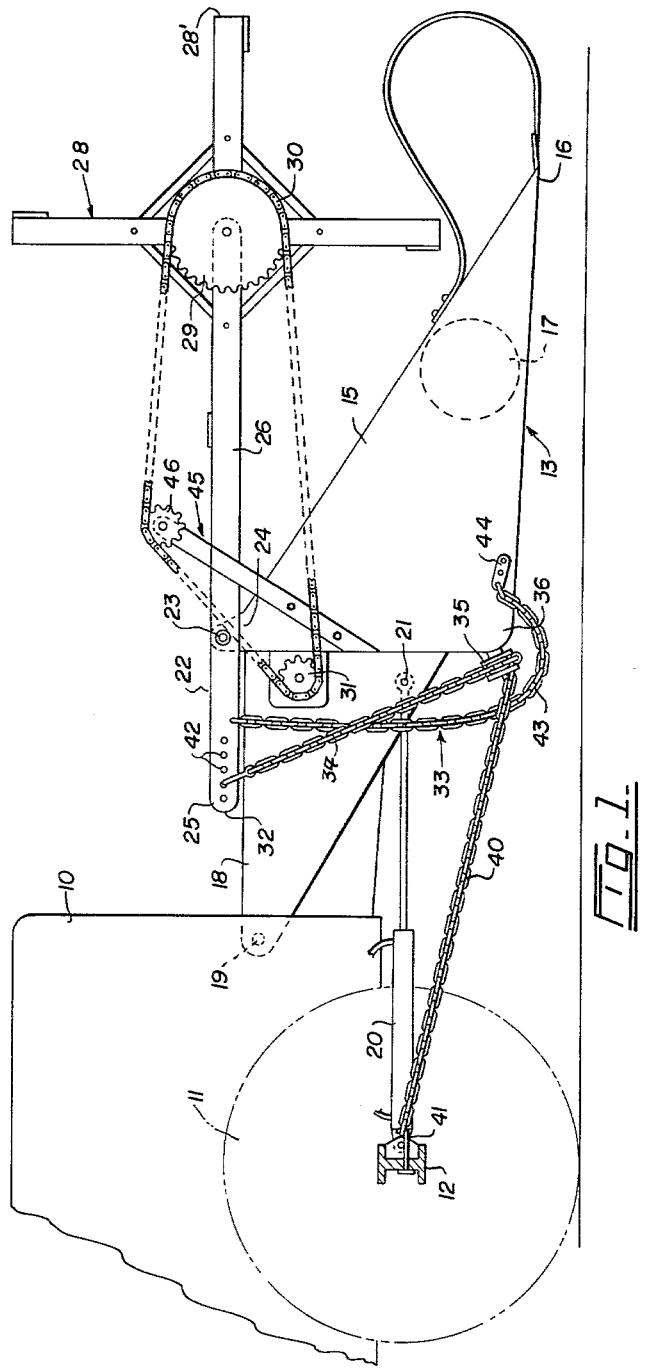
FIGURE 1 is a view of my device showing same connected to the front edge of a harvester.

Proceeding therefore to describe my invention in detail, reference character 10 illustrates the front end of a conventional harvester or combine, the construction of which is conventional and which includes front wheels, one of which is shown in phantom at 11, mounted upon a transverse front axle 12.

A table assembly collectively designated 13 comprises a rear substantially vertical wall 14, and side walls 15, a conventional knife assembly (not illustrated) being situated at 16 and a conveyor assembly outlined in phantom being provided at 17, it being understood that a source of power from the harvester 10 extends to the knife assembly 16 and the conveyor 17 in the conventional manner.

Extending rearwardly from the rear wall 14 is the conveyor unit 18 which conveys cut grain to the combine, said conveyor unit including means 19 to pivotally secure the table assembly 13 for limited movement.

A fluid operated piston and cylinder assembly 20 extends from centrally of the front axle 12 to a pivot point 21 adjacent the base of the conveyor 18 so that extension or retraction of the piston and cylinder assembly 20 causes the table to pivot around point 19 from a position wherein the knife assembly 16 is relatively close to the ground to a position spaced substantially from the ground.

A pair of spaced and parallel reel carrying arms 22 are mounted upon pivot bearings 23 adjacent the upper, outer corners 24 of the rear wall 14 and it will be noted that the rear portions 25 of these arms are shorter than the forwardly extending portions 26.

Journalled for rotation between the front ends 27 of the arms 22 is a conventional reel assembly 28, adapted to be driven by means of sprocket 29 via chain 30 which extends to a driven sprocket 31 connected to the harvester for the source of power thereof.

Connected adjacent the rear ends 32 of each of the reel carrying arms 22 is flexible linkage 33 taking the form, in this embodiment, of chains. However, it will be appreciated that flexible cables can be utilized instead of chains if desired.

Each of these chains 33 includes the inclined run portions 34 which extends from adjacent the rear ends 32 to a sheave 35 secured to adjacent the bottom rear corner 36 of the table assembly 13. Each of these chains then extends parallel to the rear wall 14 of the table in the form of a horizontal run 37, to adjacent the center of the lower rear corner 38 of the rear wall whereupon it passes around a further sheave 39 secured to the rear wall and continues rearwardly in the form of an anchoring run 40 to be secured to hooks 41 which in turn are secured to the aforementioned front axle 12 of the harvester substantially adjacent the center thereof.

Figure 3:
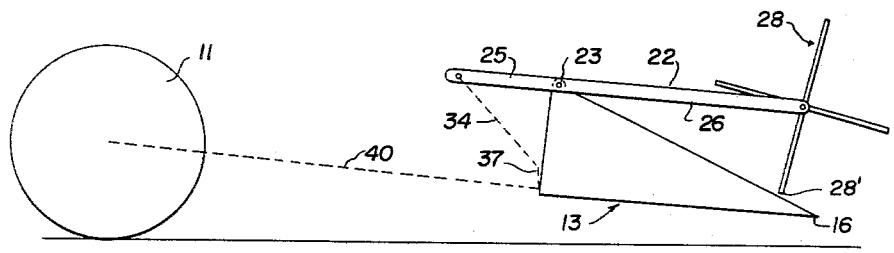
FIGURE 3 is a schematic view showing the relationship of the flexible connection and the reel with the table in the lowermost position.

From the foregoing it will be appreciated that when the table assembly is in the lowermost position as shown in FIGURE 3, the reel is at its lowermost position with the extremity 28' thereof being just a few inches above the knife assembly 16.

Figure 4:
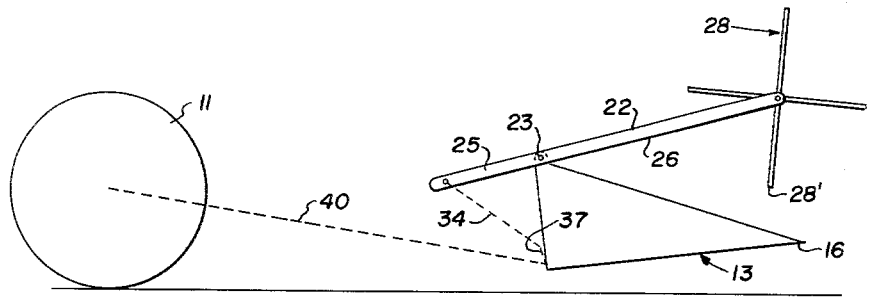
FIGURE 4 is a schematic representation showing the flexible connection, and the relationship between the reel and the table with the table in the uppermost position.

However, as the table assembly is raised by the extension of the piston and cylinder assembly 20, the cooperation of the flexible linkage together with the sheaves 35 and 39, causes the rear ends 32 of the reel carrying arms to lower thus raising the reel pivoting around points 23, so that when the table is in the uppermost position shown in FIGURE 4, the extremities 28' of the reel are spaced from the knife assembly to a greater amount.

The automatic relationship between the reel and the knife assembly is controlled by the engagement of the chain 33 to any one of a plurality of apertures 42 formed adjacent the rear ends 32 of the reel carrying arms.

Figure 2:
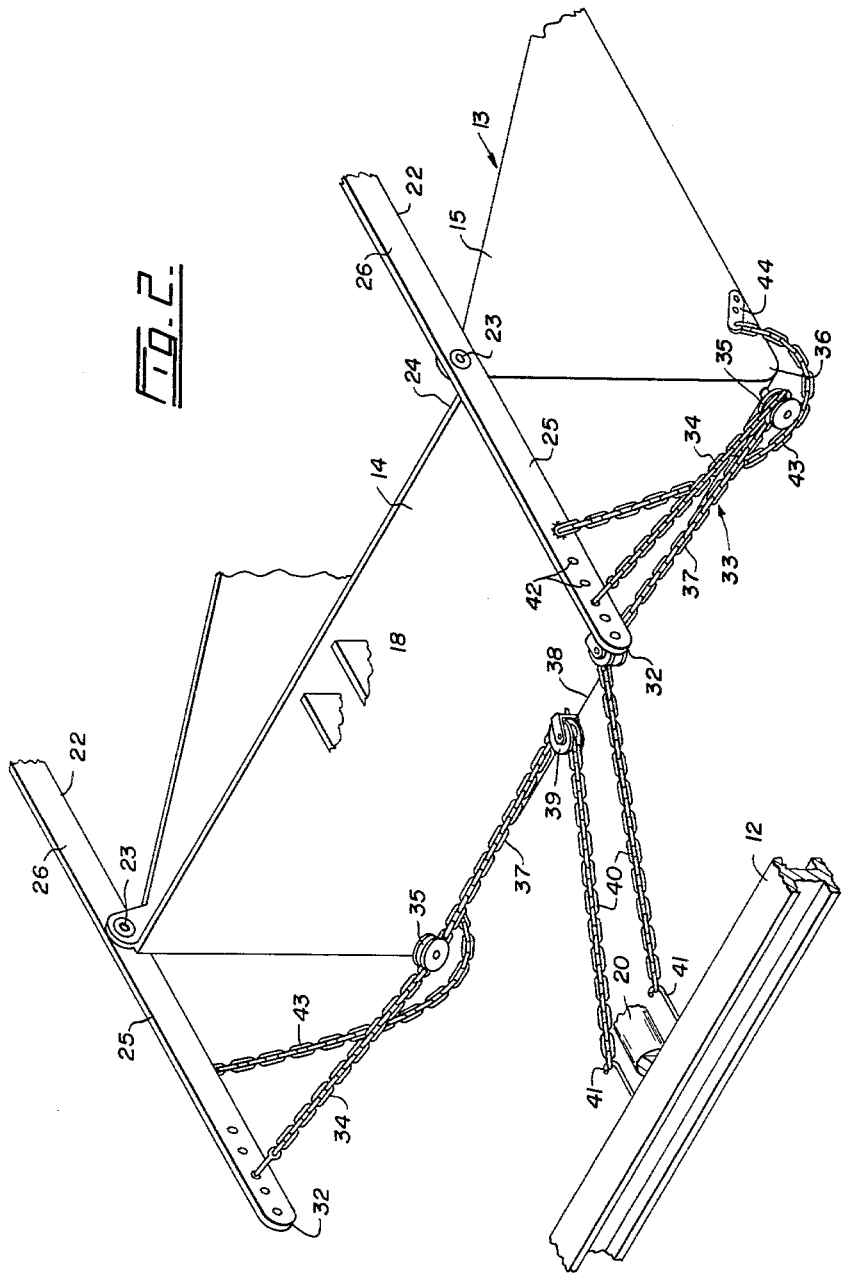
FIGURE 2 is a fragmentary isometric view showing the flexible connections between the reel carrying arms and the front axle of the harvester.

In order to protect the reel in the event that one of the flexible linkages 33 breaks, I have provided check chains 43 extending between adjacent the rear ends 32 of the reel carrying arms and anchor points 44 on the side walls 15 of the table assembly as illustrated in FIG. 2.

Due to the movement of the reel carrying arms when the table assembly is raised and lowered, I have found it desirable to provide a chain tightening assembly 45 secured to the end wall 15 of the table assembly and carrying an idler sprocket 46 upon the upper end thereof around which the aforementioned chain may pass thus providing sufficient tension to the chain irrespective of the relationship between the reel assembly and the table assembly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An automatically compensating reel and table assembly for harvesters which include a source of power, a table assembly secured for pivotal adjustment within limits to the front of the harvester and means extending between said havester and said table assembly for raising and lowering said table assembly around said pivotal securement; a reel assembly on said table assembly, said reel assembly including a pair of spaced and parallel reel carrying arms pivoted intermediate the ends thereof to the rear of the upper ends of the sides of said table, a reel journalled for rotation between the forward ends of said reel carrying arms, and at least one flexible linkage extending from a point adjacent the rear end of one of said arms, a friction reducing assembly adjacent the base of the rear of said table assembly, and said harvester, said flexible linkage including an inclining run extending between said point adjacent the rear end of the reel carrying arm to said friction reducing assembly, a substantially horizontal run extending between said last mentioned friction reducing assembly and a further friction reducing assembly situated adjacent the center of the lower side of the rear wall of said table assembly, and running substantially parallel to said rear wall, and an anchoring run extending between said further friction reducing assembly and said harvester, said anchoring run being secured to said harvester, said flexible linkage cooperating between said arm, said friction reducing assemblies and said harvester to raise and lower said reel relative to said table assembly when said table assembly is raised and lowered.

2. The device according to claim 1 in which the distance between the point of pivotal connection of said reel carrying arm and the point of conection of said flexible linkage to adjacent the rear end of said arm, is less than the distance between the point of pivotal connection of said reel carrying arm and the journal connection of said reel to the front end of said arm.

3. The device according to claim 1 which includes flexible reel lowering limiting means extending between a point adjacent the rear ends of said reel carrying arms and said table assembly, to limit the lowest position of said reel relative to said table assembly.

4. The device according to claim 2 which includes flexible reel lowering limiting means extending between a point adjacent the rear ends of said reel carrying arms and said table assembly, to limit the lowest position of said reel relative to said table assembly.

References Cited by the Examiner
UNITED STATES PATENTS

| | | | |
|---|---|---|---|
| 188,704 | 3/77 | Weed et al. | 56—221 |
| 2,696,703 | 12/54 | Kucera | 56—208 X |

ANTONIO F. GUIDA, *Acting Primary Examiner.*

RUSSELL R. KINSEY, *Examiner.*